United States Patent [19]

Yonemoto et al.

[11] Patent Number: 5,313,694
[45] Date of Patent: May 24, 1994

[54] MACHINE TOOL FOR NON-CIRCULAR AND OTHER MACHINING

[75] Inventors: Katsuyuki Yonemoto, Kurashiki; Hidehiko Miyake; Kazumasa Enoki, both of Okayama, all of Japan

[73] Assignee: Takisawa Machine Tool Co., Ltd., Okayama, Japan

[21] Appl. No.: 8,681

[22] Filed: Jan. 25, 1993

[30] Foreign Application Priority Data

Jan. 24, 1992 [JP] Japan .................. 4-34153

[51] Int. Cl.$^5$ .................. B23B 3/06; B23B 5/44; B23B 7/04; B23B 11/00
[52] U.S. Cl. .................. 29/27 R; 29/54; 82/18; 82/120; 82/138
[58] Field of Search .................. 82/18, 118, 120, 121, 82/132, 134, 134, 137, 138; 29/27 R, 27 C, 50, 54

[56] References Cited

U.S. PATENT DOCUMENTS

| | | | |
|---|---|---|---|
| 3,196,719 | 7/1965 | De Valliere | 82/148 |
| 3,727,493 | 4/1973 | Lahm | 82/118 |
| 3,796,116 | 3/1974 | Spreitzer | 82/148 |
| 3,878,742 | 4/1975 | Lahm | 82/118 |
| 4,080,853 | 3/1978 | Goto | 82/120 |
| 4,335,633 | 6/1982 | Boffelli | 82/148 |
| 4,358,888 | 11/1982 | Zankl et al. | |
| 4,413,539 | 11/1983 | Ishizuka et al. | 82/120 |
| 4,926,723 | 5/1990 | Lothammer | 82/118 |
| 5,085,109 | 2/1992 | Hidehiko et al. | |

FOREIGN PATENT DOCUMENTS

| | | | |
|---|---|---|---|
| 0371450 | 6/1990 | European Pat. Off. | 82/120 |
| 2178991 | 2/1987 | United Kingdom | B23B 3/30 |

*Primary Examiner*—William E. Terrell
*Attorney, Agent, or Firm*—Koda and Androlia

[57] ABSTRACT

Complex machining such as lathe machining and milling including non-circular machining is effected by a single machine tool effectively and highly accurately.

The machine tool comprises a spindle stock having the C-axis control function, a carriage which can be moved and positioned in a direction of the axis of a main spindle, and two tool rests installed on the carriage. Lathe machining and milling are performed by the first tool rest, and non-circular machining is performed by the second tool rest. A tailstock can be also moved in the direction of the main spindle axis, and positioning of the movable members is controlled by an NC device. A force for supporting a workpiece is controlled by a chuck and a tailstock spindle in response to an M function command.

2 Claims, 7 Drawing Sheets

MACHINE TOOL FOR NON-CIRCULAR AND OTHER MACHINING

BACKGROUND OF THE INVENTION

1. Industrial Field of the Invention

The present invention relates to improvements of tool rests and a tailstock of a machine tool for complex machining which mainly comprises two tool rests one of which performs usual circular lathe machining whereas the other tool rest exclusively performs non-circular machining.

2. Prior Art

In mechanical machining of metal, generally, each workpiece must be subjected to various kinds of machining to finish it as a product. In the case of a workpiece which requires non-circular machining, circular lathe machining, milling and so forth, it is necessary to process the workpiece by machine tools having the respective machining characteristics in different processing steps, i.e., to conduct non-circular machining by a machine tool of a copying method or numerical control method (U.S. Pat. No. 5,085,109), circular machining by a lathe (G.B. Patent No. 2,178,991A), and milling by a machining center or a milling machine (U.S. Pat. No. 4,358,888). Further, every time the machine tools are changed for the next processing step, a skillful operator uses jigs and measuring devices so as to obtain alignment of a reference position for the previous step and a reference position for the subsequent step.

A workpiece is supported by a chuck at a distal end portion of a main spindle which serves as workpiece supporting means, and by thrust of a tailstock spindle of a tailstock. In this case, clamping force of the chuck and thrust of the tailstock spindle are determined by hydraulic pressure control such that the supporting force during machining of the workpiece can endure the maximum cutting resistance. Usually, the workpiece supporting force is unchanged until the machining is over. The clamping force and the thrust more than necessary cause the workpiece to be deformed or distorted, and it is difficult to maintain high machining accuracy.

When the machining arrangement is changed, a tailstock is manually moved and positioned in most cases. In the case of automatic operation, the tailstock is moved for a predetermined distance forwardly or backwardly by means of a hydraulic cylinder or the like, and the tailstock can not be freely positioned at an intermediate location in this stroke.

As described above, various kinds of machining are often required for a single workpiece. Conventionally, there has been used a machine tool for complex machining which performs lathe machining, milling and drilling by use of C-axis, Z-axis, X-axis and Y-axis mechanisms. However, there has not been found a machine tool for complex machining which enables non-circular machining such as elliptic machining.

It is an object of the present invention to provide a machine tool for complex machining which has a non-circular machining function, a circular lathe machining function, and/or a milling function, in order to improve accuracy in workpiece machining including non-circular machining and to lessen the number of processing steps, thereby enhancing the productivity. For instance, a piston for an engine has pin holes, oil holes and ring grooves, and the outer periphery generally has an elliptic cross-sectional configuration whose length and breadth have a slight difference. In order to process such a workpiece, elliptic finishing requires an elliptic machining function, and machining of the ring grooves requires a lathe machining function, while machining of the pin holes and oil holes requires a drilling function. Especially when the elliptic finishing is performed, the target portion of the workpiece is usually processed into a circular cross-sectional configuration before the final elliptic finishing so as to improve the machining accuracy. Also, alignment of machining references such as positional relations between the pin holes and the oil holes with respect to the length and breadth positions of the elliptic cross-sectional configuration is necessary for finishing the piston as a product.

Consequently, alignment of the reference of non-circular machining and the reference of milling is required. In the prior art, every time the machining arrangement is changed for the next processing step, machining reference positions must be determined by use of precise jigs and various measuring devices so as to determine reference positions for the preliminary machining. Such operations interposed between the processing steps often induce errors, and accumulated errors become so large that it is difficult to maintain the machining accuracy of each workpiece at a certain level when the workpiece is finished. Taking this into account, a machine tool for complex machining which has a non-circular machining function, a circular lathe machining function, and/or a milling function is required for improving accuracy in workpiece machining including non-circular machining and for enhancing the machining efficiency.

As workpiece supporting means, there have conventionally been employed a method of supporting a workpiece only by a chuck at a distal end portion of the main spindle, and a method of supporting a workpiece both by a chuck at a distal end portion of the main spindle and a tailstock spindle on the side of a tailstock (as disclosed in, for instance, G.B. Patent No. 2,178,991A). In general, considering the cutting resistance at the time of workpiece machining, clamping force of the chuck and thrust of the tailstock spindle are determined by hydraulic pressure control, and the workpiece supporting force is kept constant until the machining is over. When the supporting force is constant in this manner irrespective of the cutting resistance of the workpiece, the supporting force exceeds the rigidity of the workpiece, and the workpiece during the machining is deformed or distorted. As a result, when the workpiece is released from the supporting force after the machining is over, it is often found that the workpiece does not have a predetermined machining accuracy as a final product. The elliptic configuration of a piston only allows an error of several microns in the machining accuracy. Therefore, since deformation or distortion caused by the workpiece supporting force greatly influences the machining accuracy, it must be made as small as possible.

Moreover, when the machining arrangement is changed for another workpiece, the tailstock must be moved and positioned in accordance with the size of the workpiece. In this case, manual operation for moving the tailstock requires a large amount of labor, and an operator must be particularly careful for positioning the tailstock precisely.

SUMMARY OF THE INVENTION

Therefore, the present invention has the following structure. That is to say, the invention provides a machine tool characterized in that it comprises a spindle stock which includes a main spindle having a function of rotational angle control (hereinafter referred to as the C-axis control) and a workpiece holder (referred to as the chuck) provided on a distal end portion of the main spindle, a carriage movable in parallel to the axis of the main spindle, two tool rests independently installed on the carriage, and a numerical control device (referred to as the NC device) which effects the C-axis control function of the main spindle and positioning control of the two tool rests, wherein the two tool rests move in directions perpendicular to the main spindle axis, and one of the tool rests is a tool rest to which a single type or complex type cutting tool for lathe machining and/or milling (including drilling) of a workpiece can be attached, whereas the other of the tool rests is a tool rest to which a single type or complex type cutting tool for performing non-circular machining exclusively can be attached.

This invention also provides a machine tool characterized in that it comprises a tailstock which is located opposite to a main spindle and provided movably in a direction of the axis of the main spindle, and a tailstock spindle whose axis defines a common axis with the main spindle axis on the tailstock and which can selectively control a plurality of thrusts.

The mechanical structure will now be explained more specifically. The spindle stock includes the main spindle whose axis O extends horizontally, and which has the C-axis control function for determining an angle of rotation having the main spindle axis O as a rotational axis. The hydraulic type chuck whose clamping force for supporting the workpiece can be changed into a plurality of levels is provided on the distal end portion of the main spindle. This spindle stock is securely fixed on a bed. The first and second tool rests are installed on the carriage, and the two tool rests are adjacent to each other. The carriage slides on the bed by a Z-axis servo motor in a direction in parallel to the main spindle axis, i.e., in a Z-axis direction, so as to be positioned at a certain location. A plurality of cutting tools can be attached to the first tool rest, and a lathe machining tool or a milling tool can be selected to be ready for machining. By driving an X-axis servo motor, the first tool rest can be moved and positioned in a direction perpendicular to the Z-axis, i.e., in an X-axis direction. By driving a $U_1$-axis servo motor, the second tool rest enables a second cross slide to move in a $U_1$-axis direction to be positioned at a certain location. A slider is provided on the second cross slide, and the slider is positioned to be reciprocated minutely at high speed in a $U_2$-axis direction by driving a $U_2$-axis servo motor. The weight of this slider is made as light as possible, and the sliding resistance of the sliding portion is suppressed by using highly accurate parts and by forcible lubrication. The single type or complex type cutting tool can be attached to a distal end portion of the slider.

A W-axis square screw is screwed in the tailstock so that the tailstock can move on the bed in the direction of the main spindle axis O in response to a command from the NC device, and that positioning control of the tailstock in a W-axis direction can be effected. The axis of the tailstock spindle defines a common axis with the main spindle axis O on the tailstock, and the tailstock spindle can be moved forwardly or backwardly in a direction opposite to that of the main spindle by hydraulic operation, while generating thrust for pressing the workpiece. In an auxiliary function of the program of the NC device (hereinafter referred to as the M function), several kinds of pressures are stored in advance as the thrust of the tailstock spindle. An electromagnetic hydraulic pressure control valve is controlled through a hydraulic pressure valve controlling device in response to an M function signal of the program in accordance with the cutting resistance during machining.

With the above-described mechanical structure, there has been developed the machine tool for complex machining including the NC device which conducts the C-axis control, positioning control of the two tool rests, and control for changing the clamping force of the chuck and the thrust of the tailstock spindle by means of the M function. This machine tool is particularly characterized in that the two tool rests which are installed on the carriage respectively perform lathe machining and non-circular machining exclusively, and that the workpiece supporting force is controlled by regulating the clamping force of the chuck and the thrust of the tailstock spindle so as to decrease deformation or distortion of the workpiece, thus improving the machining accuracy and enhancing the machining efficiency.

With such a machine tool according to the invention, once the workpiece is clamped by the chuck at the distal end portion of the main spindle, it can be subjected to various kinds of machining, such as lathe machining, non-circular machining and milling, continuously and effectively without being detached until the machining is over.

In response to a command from the NC device, the main spindle is rotated, and also, the Z-axis servo motor and the X-axis servo motor are controlled to position the first tool rest in the Z-axis and X-axis directions. Then, the first tool rest performs lathe machining and fulfills the function as an NC lathe. Moreover, a plurality of tools can be attached to the first tool rest, and milling can be performed by a milling tool in addition to lathe machining by a lathe machining tool. As for the tool on the second tool rest, a main spindle driving motor incorporated in the spindle stock, the Z-axis servo motor and the $U_2$-axis servo motor are simultaneously controlled in response to a command from the NC device, and the slider is positioned in the Z-axis direction and the $U_2$-axis direction in synchronism with the C-axis control of the main spindle, thereby achieving non-circular machining. At this time, the slider repeats reciprocation minutely and at high speed. However, the second cross slide performs positioning of the whole second tool rest in accordance with the machining diameter of the workpiece prior to the non-circular machining, and at the time of non-circular machining, it is usually used in a stopped state. Although the method of controlling the C-axis, the Z-axis and the $U_2$-axis simultaneously is described in this specification, it is possible to control the C-axis, the Z-axis and the $U_1$-axis simultaneously.

As the workpiece supporting method, the following two methods are generally employed in accordance with the configuration of the workpiece. One is a method of supporting the workpiece both by the chuck to which a hydraulic rotating cylinder is applied and the tailstock spindle using a hydraulic cylinder, and the other is a method of supporting the workpiece only by the chuck. The clamping force of the chuck and the thrust of the tailstock spindle are prepared as the M function of the program of the NC device, and the M function is properly selected in the program in accordance with the rigidity and the cutting resistance of the workpiece. When the hydraulic pressure valve controlling device regulates the electromagnetic hydraulic pressure control valve in response to a command of the M function, the workpiece supporting force is controlled to prevent deformation of the workpiece and to make distortion of the workpiece as small as possible.

When the machining arrangement is changed for another workpiece, the tailstock must be moved and positioned in accordance with the size of the workpiece. At this time, a W-axis servo motor is driven in response to a command from the NC device, so as to rotate the W-axis square screw, thereby facilitating precise positioning of the tailstock in a W-axis direction.

DETAILED DESCRIPTION OF THE PREFERRED EMBODIMENT

Figure 1:
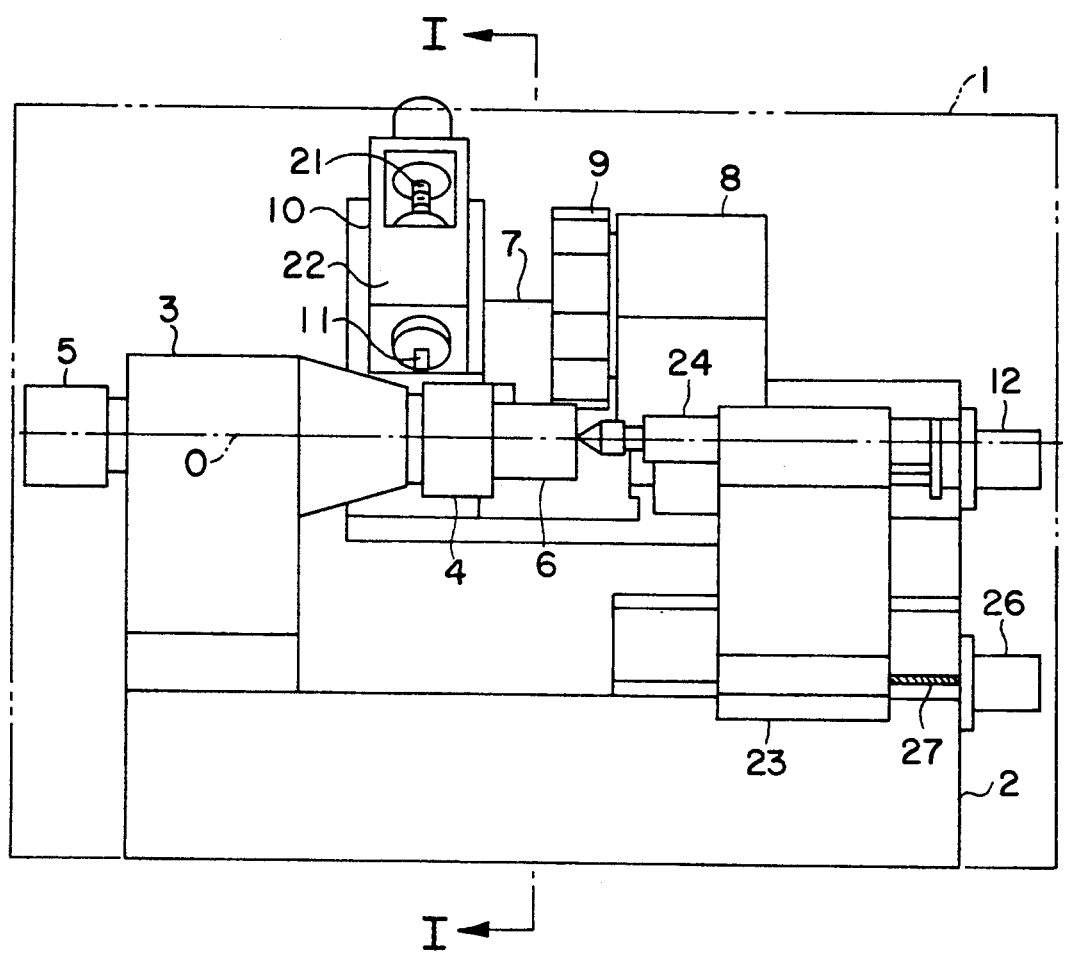
FIG. 1 is a front view of a machine tool.

One embodiment of the present invention will be hereinafter described in detail with reference to the attached drawings. FIG. 1 is a front view of a machine tool according to the invention, as viewed from an operator's side (from the bottom side of this drawing), showing the structure of a machine tool main body 1. A spindle stock 3 is securely fixed on the left side of a bed 2, with the axis O of a main spindle extending horizontally. A chuck 4 of a workpiece 6 is operated by a hydraulic rotating cylinder 5. A tailstock 23 is provided opposite to the spindle stock 3. A carriage 7 moved by a Z-axis servo motor 12 is provided on the remote side of the main spindle axis O from the operator (on the top side of this drawing). A second tool rest 10 is located on the left side of the carriage 7, and a first tool rest 8 is located adjacent to the second tool rest 10 and on the right side of the carriage 7. The tailstock 23 having a tailstock spindle 24 is moved by a W-axis servo motor 26 and a W-axis square screw 27, as will be described later.

Figure 2:
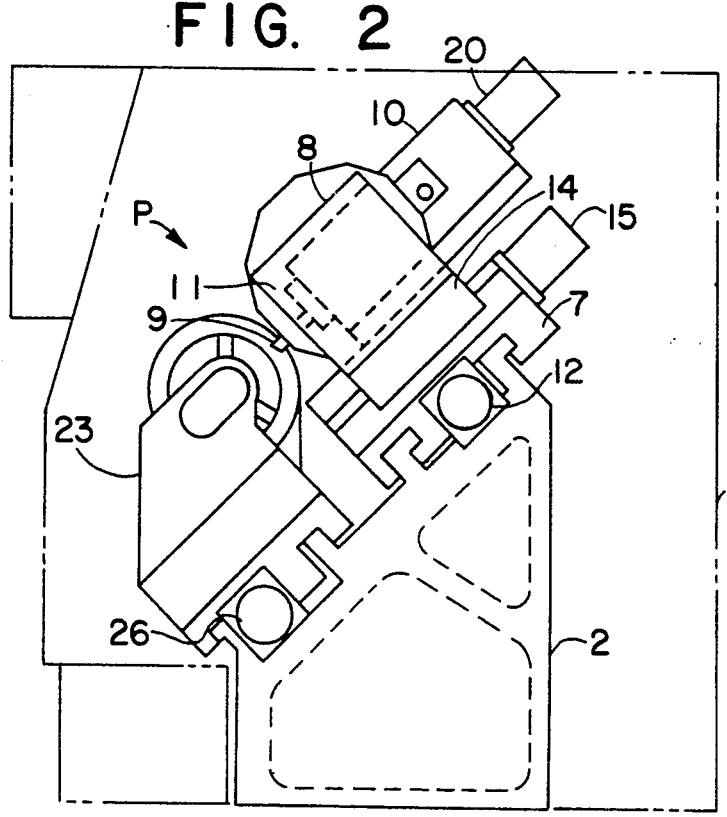
FIG. 2 is a right side view of the machine tool.

FIG. 2 is a right side view of FIG. 1, and the left side of the axis of the tailstock spindle of FIG. 2 is the operator's side. The tailstock 23 is provided on the left side of the bed 2. On the side remote from the operator, the carriage 7, the first tool rest 8 which can select one from a plurality of first tools 9 to be ready for machining, and the second tool rest 10 having a second tool 11 are inclined with respect to the horizontal plane, the first and second tool rests being located above the carriage 7. In this embodiment, both the tool 9 of the first tool rest 8 and the tool 11 of the second tool rest 10 are designed to have edges extending downwardly so that cutting chips can be easily discharged downwardly. The first tool rest 8 above the carriage 7 is moved by operating a first cross slide 14 by an X-axis servo motor 15. The second tool rest 10 is carried and moved by a second cross slide, as will be described later, and vibrated minutely by a $U_2$-axis servo motor 20.

Figure 3:
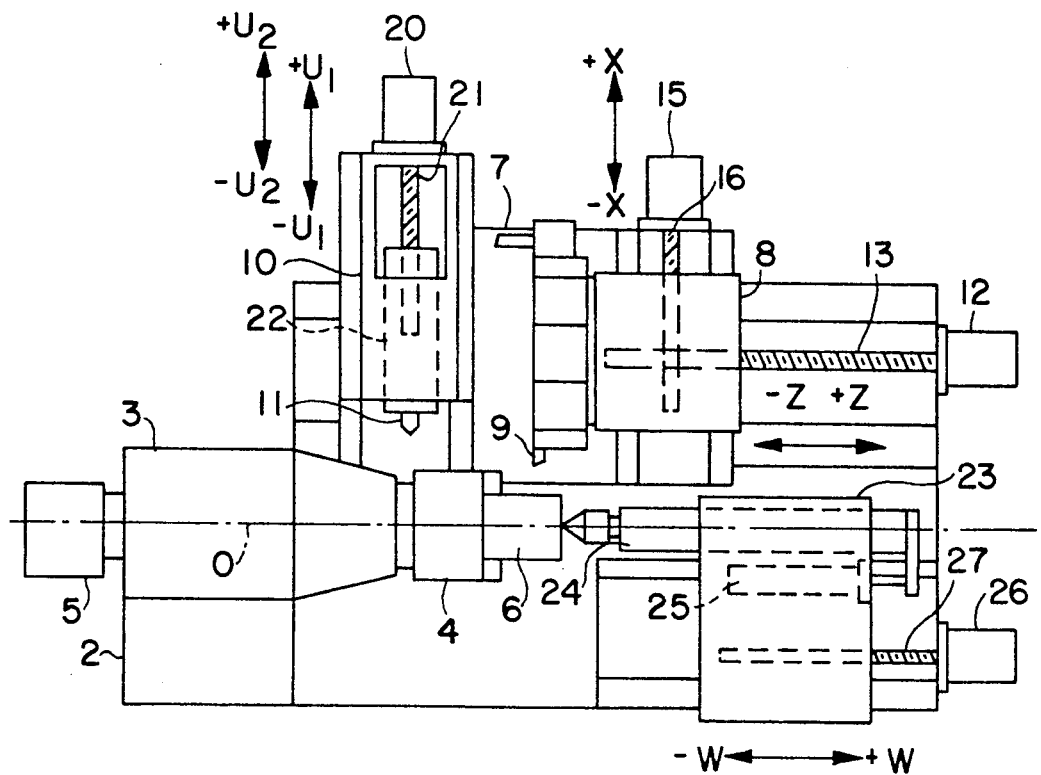
FIG. 3 is a plan view, as viewed in a direction indicated by the arrow P of FIG. 2.

FIG. 3 is a plan view showing the structure of movable members of the machine tool main body 1, as viewed in a direction indicated by the arrow P of FIG. 2. The spindle stock 3 is securely fixed on the bed 2 in such a manner that the main spindle axis O extends horizontally. The chuck 4 for holding the workpiece 6 is provided on the main spindle rotatably supported on the spindle stock 3. The C-axis control of the main spindle is performed by a main spindle driving motor (not shown) incorporated in the spindle stock 3. A Z-axis ball screw 13 is provided in the Z-axis direction in parallel to the main spindle axis O. The Z-axis ball screw 13 is rotated by the Z-axis servo motor 12 connected to an end portion thereof. The Z-axis ball screw 13 is screwed in the carriage 7 which can be moved in the Z-axis direction, and is engaged with it so that it can be slid on the bed 2 in the Z-axis direction. The two tool rests 8 and 10 are independently provided on the carriage 7. The first tool rest 8 can be moved on the carriage 7 in the X-axis direction to be positioned at a certain location by means of the X-axis servo motor 15. The adjacent second tool rest 10 can be moved and positioned in the $U_1$-axis and $U_2$-axis directions in parallel to the X-axis direction. Further, the tailstock 23 for supporting the workpiece 6 can be moved and positioned in the W-axis direction in parallel to the Z-axis direction through rotation of the W-axis square screw 27 by means of the W-axis servo motor 26. Also, the tailstock spindle 24 can be moved forwardly or backwardly in the W-axis direction by means of a hydraulic cylinder 25.

Figure 4:
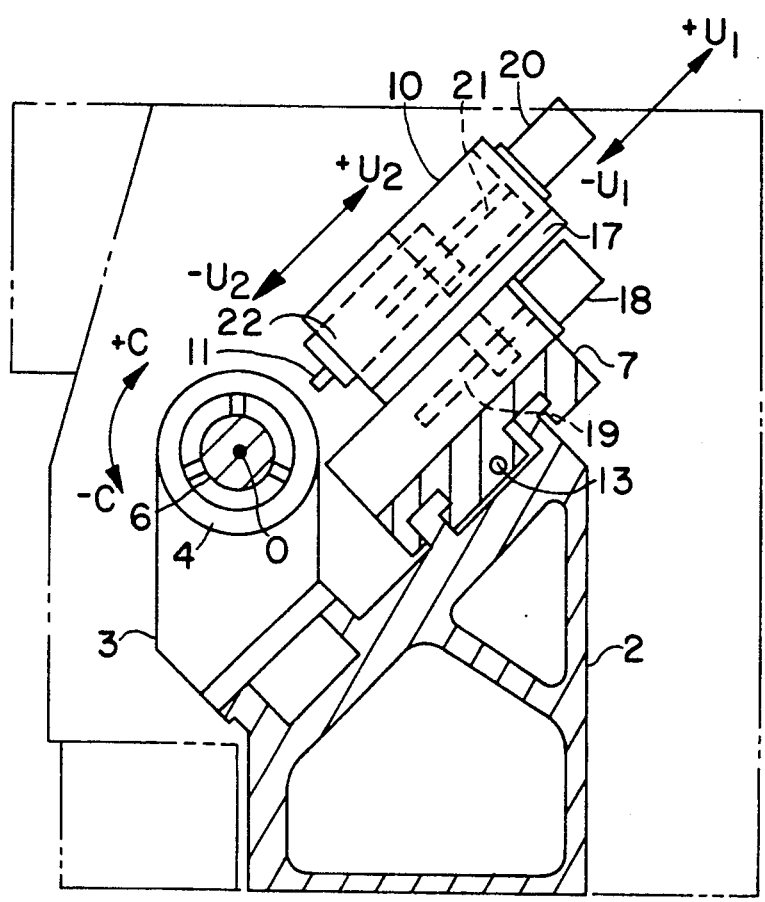
FIG. 4 is a cross-sectional view taken along the line I—I of FIG. 1, as viewed in a direction indicated by the arrows.

FIG. 4 is a cross-sectional view taken along the line I—I of FIG. 1, as viewed in a direction indicated by the arrows, showing the relation between the second tool rest 10 and the spindle stock 3. A $U_1$-axis servo motor 18 is provided on the carriage 7 in the $U_1$-axis direction. The $U_1$-axis servo motor 18 rotates a $U_1$-axis ball screw 19 connected to an end portion thereof. The second cross slide 17 is fitted on the $U_1$-axis ball screw 19 so that it moves relatively in the $U_1$-axis direction. The second cross slide 17 is a main slider of the second tool rest 10. The $U_2$-axis servo motor 20 is provided on the second cross slide 17 in the $U_2$-axis direction. The $U_2$-axis servo motor 20 rotates a $U_2$-axis ball screw 21 connected to an end portion thereof. A slider 22 is fitted on the $U_2$-axis ball screw 21 so that it moves relatively in the $U_2$-axis direction by means of the $U_2$-axis ball screw 21. A single type or complex type cutting tool 11 is attached to the distal end of the slider 22. The tool edge is inclined downwardly from the horizontal plane in substantially the same manner as the first tool rest 8, and is moved in the $U_1$-axis and $U_2$-axis directions, so that cutting chips can be easily discharged downwardly. The slider 22 is designed to have a weight as light as possible because it reciprocates minutely and at high speed, and also, its sliding portion has such a structure that the sliding resistance is made small by employing highly accurate parts and by forcible lubrication.

Figure 5:
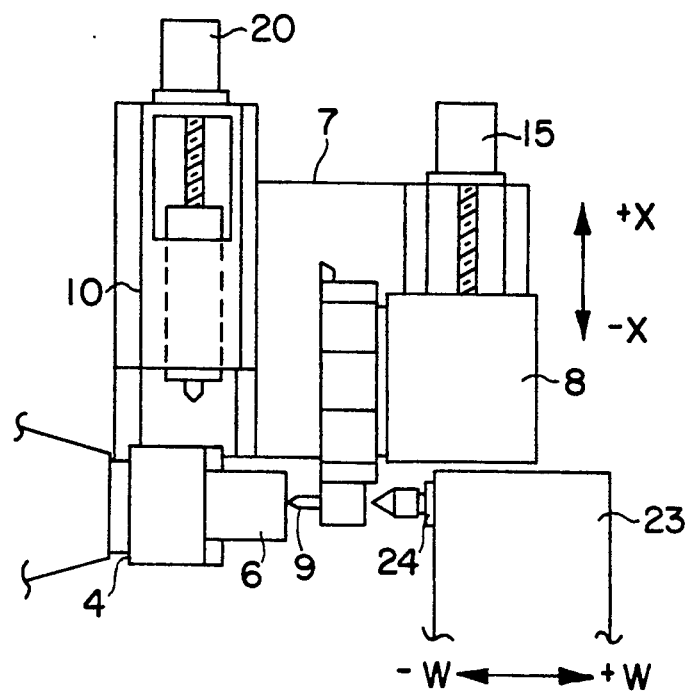
FIG. 5 is a diagram showing a condition of center hole machining by a first tool rest.

FIG. 5 illustrates a condition of center hole machining by the first tool rest 8. In the center hole, the workpiece 6 clamped by the main spindle chuck 4 is supported by use of the tailstock spindle 24 of the tailstock 23. In this condition, the tailstock 23 is retreated in the +W-axis direction in order not to interfere with the cutting tool 9 and the first tool rest 8. When the center hole machining is over, the first tool rest 8 is moved away in the +W-axis direction, and the tailstock spindle 24 is moved forwardly in the −W-axis direction in response to a command of the program, so as to support the workpiece 6.

Figure 6:
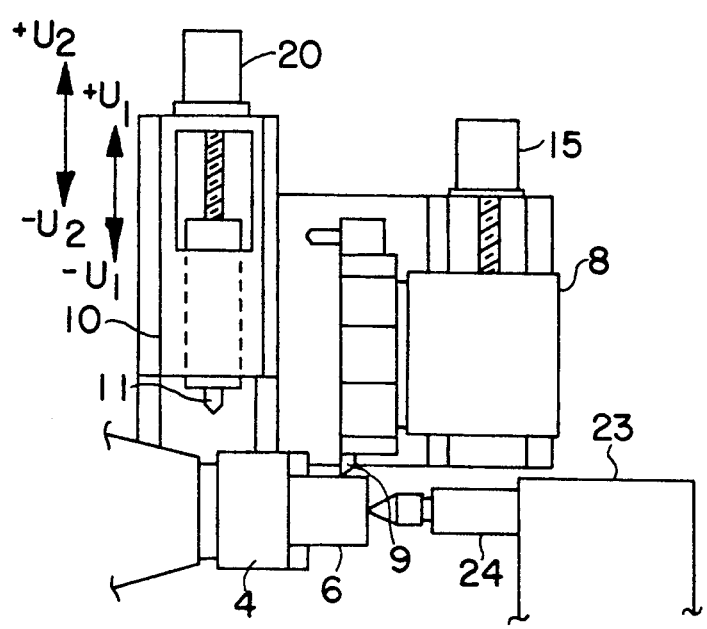
FIG. 6 is a diagram showing a condition of lathe machining by the first tool rest.

FIG. 6 illustrates a condition of lathe machining by the first tool rest 8 in which the workpiece 6 is supported by the chuck 4 and the tailstock spindle 24. Here, the machine tool functions as an NC lathe. In this condition, the second tool rest 10 is retreated in the +$U_1$-axis and +$U_2$-axis directions in order not to interfere with the workpiece 6 and the chuck 4.

Figure 7:
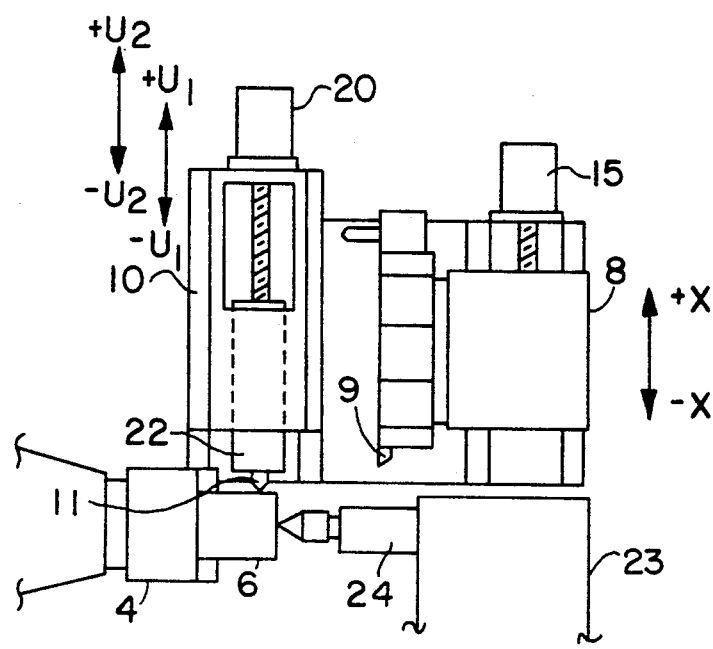
FIG. 7 is a diagram showing a condition of non-circular machining by a second tool rest.

FIG. 7 illustrates a condition of non-circular machining by the second tool rest 10. That portion of the workpiece whose outer periphery has been processed to be circular by the first tool rest 8 is subjected to non-circular machining by the second tool rest 10. Since the elliptic configuration of the outer periphery of a piston only allows a difference of several microns, accuracy in positioning of the second tool rest 10 which influences machining preciseness, and deformation or distortion of the workpiece 6 caused by the clamping force with respect to the workpiece 6 at the finishing stage are critical factors. Taking into consideration the fact that the cutting resistance of the finishing is not so large as that of the rough machining, the pressure is controlled in response to an M function command of the program, and the clamping force of the chuck 4 and the thrust of the tailstock spindle 24 are decreased, to thereby eliminate deformation or distortion of the workpiece 6. In this condition, the first tool rest 8 is retreated in the +X-axis direction in order not to interfere with the workpiece 6 and the tailstock spindle 24.

Figure 8:
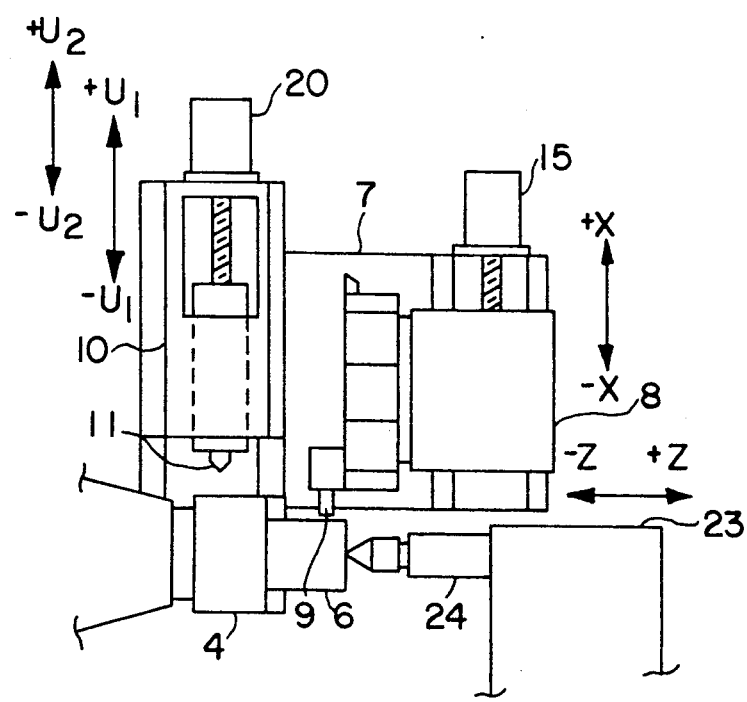
FIG. 8 is a diagram showing a condition of milling by the first tool rest.

FIG. 8 illustrates a condition of milling by the first tool rest 8. Since the milling is performed after the elliptic machining, positioning of the main spindle in the direction of the rotational angle is carried out by the C-axis control function so that the length and the breadth will have a certain positional relation. While keeping the main spindle stopped, machining is effected by controlling the first tool rest 8 along the Z-axis and/or the X-axis. Alternatively, machining can be effected by controlling the first tool rest 8 along three axes, i.e., the C-axis, the Z-axis and the X-axis, simultaneously. In this condition, the second tool rest 10 is retreated in the +$U_1$-axis and +$U_2$-axis directions in order not to interfere with the workpiece 6 and the chuck 4.

Figure 9:
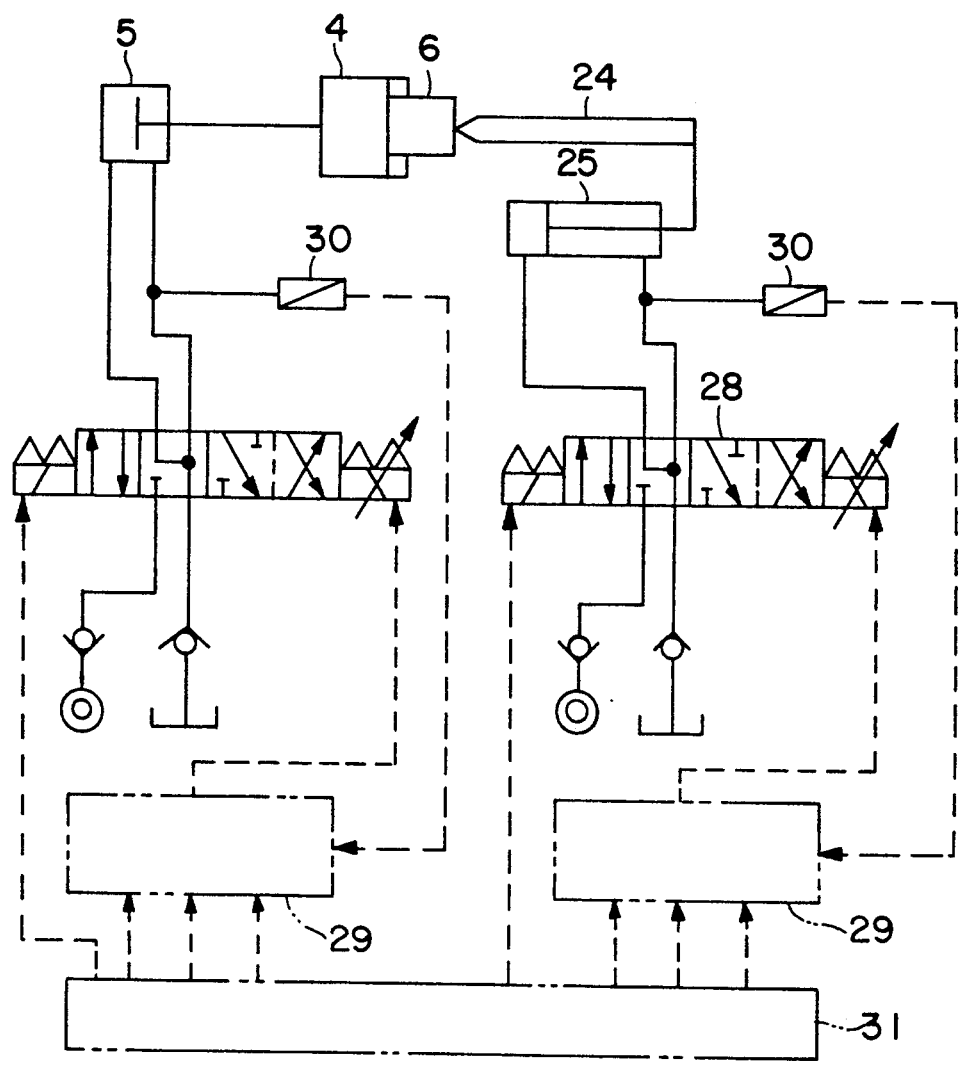
FIG. 9 is a hydraulic pressure circuit diagram of a chuck and a tailstock spindle and their control system diagram.

FIG. 9 is a hydraulic pressure circuit diagram of the chuck 4 and the tailstock spindle 24 and their control system diagram. A hydraulic pressure valve controlling device 29 receives a preset pressure produced in response to an M function signal command from an NC device 31 and a pressure detected by a pressure sensor 30 on the side of the hydraulic cylinder 25 of the tailstock spindle 24, and an electromagnetic hydraulic pressure control valve 28 is controlled to determine the thrust. In substantially the same manner, the pressure of the chuck 4 is determined by the hydraulic rotating cylinder 5, thus controlling the clamping force with respect to the workpiece 6.

Figure 10:
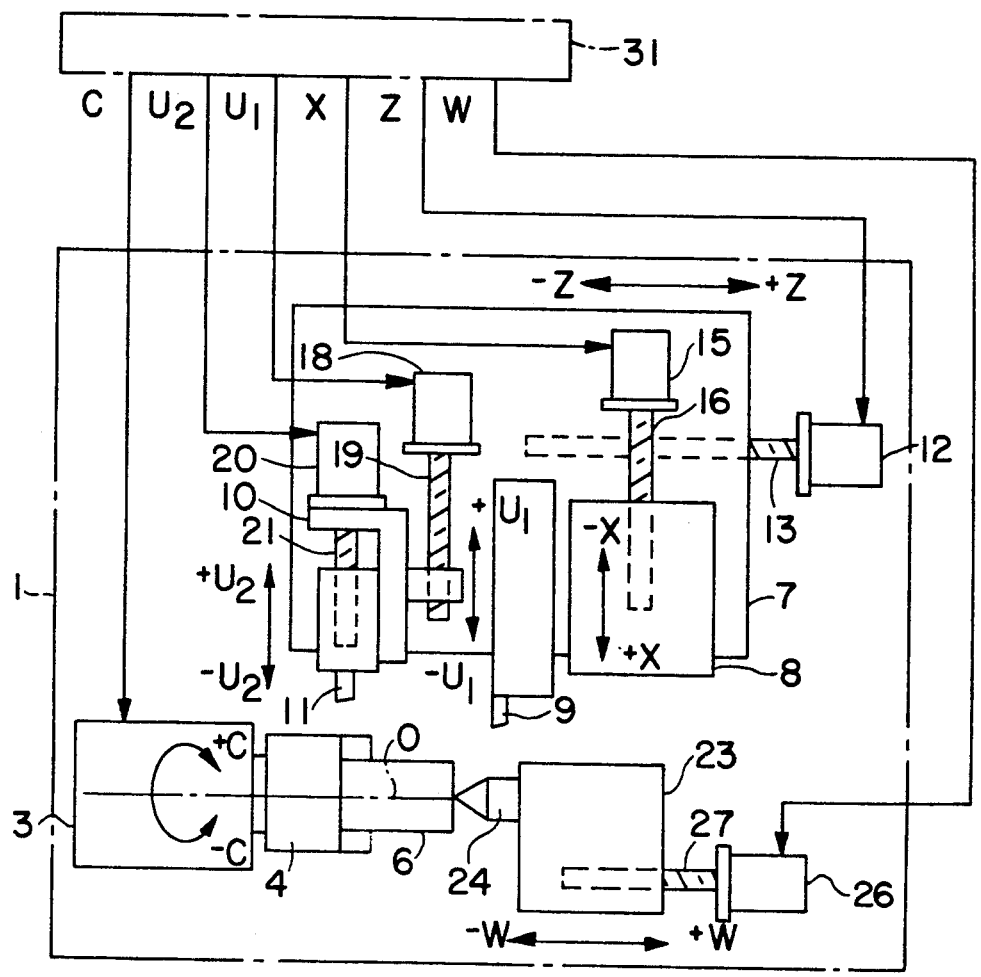
FIG. 10 is a control system diagram of an NC device.

FIG. 10 is a control system diagram showing movements of the movable members of the machine tool main body 1. It shows the NC device 31 for positioning control of six axes, i.e., the C-axis, the Z-axis, the X-axis, the $U_1$-axis, the $U_2$-axis and the W-axis, and the machine tool main body 1. In this embodiment, control axes for moving in directions in parallel to the main spindle axis O are the Z-axis and the W-axis, and control axes for moving in directions perpendicular to the main spindle axis O are the X-axis, the $U_1$-axis and the $U_2$-axis. Further, the C-axis is a control axis for a rotational angle about the main spindle axis O. The NC device 31 is connected to the Z-axis servo motor 12 and the X-axis servo motor 15. In response to a command of the program from the NC device 31, the Z-axis and the X-axis are controlled to position the first tool rest 8. Since the first tool rest 8 has a milling function, milling can be performed by conducting positioning control with the C-axis control. Also, the NC device is connected to the main spindle driving motor incorporated in the main spindle, the Z-axis servo motor 12, the $U_1$-axis servo motor 18 and the $U_2$-axis servo motor 20. In response to a command of the program from the NC device 31, the C-axis, the Z-axis, the $U_1$-axis and the $U_2$-axis are controlled to position the second tool rest 10. In this case, the C-axis, the Z-axis and the $U_2$-axis are simultaneously controlled so that the second tool rest 10 performs non-circular machining exclusively.

In the embodiment of the present invention, the two tool rests 8 and 10 are located on the remote side of the main spindle axis O from the operator. However, in order to improve the productivity to a further extent, two additional tool rests can be installed on the operator's side of the main spindle axis O, thereby providing a symmetrical structure.

According to this invention, once a workpiece is mounted, other machining such as lathe machining and milling including non-circular machining can also be performed by a single machine tool, so that highly precise articles can be produced, and that the number of machining steps can be drastically lessened, thus improving the productivity. Further, since an exclusive machine tool for each of the machining steps is not necessary, an installation area of machines can be decreased, and also, the level of the operator's skillfulness can be lowered.

The NC device which enables the C-axis control and non-circular machining is provided to facilitate positioning in the rotational angle control of elliptic machining of a piston or the like and of milling, so as to improve the machining accuracy of products. Thus, it is possible to reduce the expenses for manufacturing or purchasing jigs for positioning machining references and measuring means which are required for each of the machining steps. Also, it is possible to eliminate operational errors and mistakes of the operator completely, to thereby decrease defected products.

The present invention has the structure in which the two tool rests are provided on the single carriage, so that the operation can be performed more easily than the case where two tool rests are provided on two individual carriages, and that the operator can operate them in substantially the same manner as operating a machine tool of a biaxial control structure. Consequently, the invention structure is economical and simple to operate.

In respect of safety, it is effective with less interferences.

Moreover, by controlling the clamping force of the chuck and the thrust of the tailstock spindle for supporting the workpiece, deformation or distortion of the workpiece can be made as small as possible, thus improving the quality of products.

Furthermore, when the machining arrangement is changed for another workpiece, the tailstock must be moved and positioned in accordance with the size of the workpiece. The command from the NC device facilitates this positioning, and time for such arrangement change can be shortened, to thereby improve the productivity and the product quality.

What is claimed is:

1. A machine tool for non-circular machining comprising a spindle stock which includes a main spindle having a rotational angle control function and a workpiece chuck provided on a distal end portion of the main spindle, a tailstock which is located opposite to a main spindle and provided movably in a direction of the axis of the main spindle, a carriage movable in parallel to the axis of said main spindle, first and second tool rests independently installed on respective cross slides on said carriage, and a numerical control device which effects the rotational angle control function of said main spindle and positioning control of said first and second tool rests, wherein said first and second tool rests move in directions perpendicular to the main spindle axis during machining, and the first tool rest is a tool rest supporting a single type or complex type cutting tool for lathe machining and/or milling of a workpiece, whereas the second tool rest is a tool rest supporting a single type or complex type cutting tool for performing non-circular machining exclusively, the second tool rest having a slider and means for moving the slider in the direction perpendicular to the main spindle axis direction in synchronism with the rotational angle control of the main spindle.

2. A machine tool for non-circular machining as claimed in claim 1, wherein said tailstock has a tailstock spindle whose axis defines a common axis with the main spindle axis on the tailstock, and the numerical control device operates to change the thrust of said tailstock spindle into a plurality of levels during the machining of the workpieces as required.

* * * * *